United States Patent [19]
Yada et al.

[11] Patent Number: 4,612,336
[45] Date of Patent: Sep. 16, 1986

[54] PROCESS FOR PREPARING WATER-SOLUBLE ACRYLIC POLYMERS BY IRRADIATING AQUEOUS MONOMER SOLUTIONS CONTAINING A SURFACTANT

[75] Inventors: Akira Yada, Kusatsu; Shusaku Matsumoto, Kyoto; Yoshihiro Kawamori, Joyo; Takao Saito, Nagaokakyo; Tadashi Nishiyama; Yoshitugu Adachi, both of Kyoto, all of Japan

[73] Assignee: Dai-Ichi Kogyo Seiyaku Co., Ltd., Kyoto, Japan

[21] Appl. No.: 704,414

[22] Filed: Feb. 22, 1985

[30] Foreign Application Priority Data

Dec. 27, 1984 [JP] Japan ................................ 59-281714
Dec. 27, 1984 [JP] Japan ................................ 59-281715

[51] Int. Cl.$^4$ ........................ C08F 2/50; C08F 220/56
[52] U.S. Cl. ........................................ 522/3; 522/14; 522/79; 522/84
[58] Field of Search .............. 204/159.23; 522/3, 14, 522/79, 84

[56] References Cited

U.S. PATENT DOCUMENTS

| | | | |
|---|---|---|---|
| 4,100,047 | 7/1978 | McCarty | 204/159.23 |
| 4,308,148 | 12/1981 | Boutin et al. | 204/159.23 |
| 4,404,073 | 9/1983 | Bartissol et al. | 204/159.23 |
| 4,486,489 | 12/1984 | George | 204/159.23 |

Primary Examiner—Wilbert J. Briggs, Sr.
Attorney, Agent, or Firm—Antonelli, Terry & Wands

[57] ABSTRACT

A process for preparing particulate water-soluble acrylic polymers, e.g. acrylamide or methacrylamide polymers and cationic acrylic polymers, having a high molecular weight, an excellent water solubility and a uniform particle size with a good productivity, which comprises:

(a) adding at least one surfactant selected from the group consisting of a non-ionic surfactant and an anionic surfactant to an at least 20% by weight aqueous solution of a vinyl monomer in an amount of 0.001 to 1% by weight based on the monomer.

(b) adjusting the dissolved oxygen in the aqueous monomer solution to at most 1 mg/liter, (c) admixing the aqueous monomer solution with at most 0.03% by weight of a photopolymerization initiator based on the monomer, (d) continuously feeding the aqueous monomer solution in the form of a layer having a thickness of 3 to 10 mm onto a moving support located in an atmosphere containing at most 1% by volume of oxygen, (e) irradiating the layer of the aqueous monomer solution on the moving support with ultraviolet rays having a wavelength of 300 to 450 millimicrons at an intensity of at most 50 W/m$^2$, (f) continuously taking out the produced polymer in the form of a sheet having a thickness of 3 to 10 mm from the moving support, (g) breaking the polymer sheet to cubic pieces of 3 to 10 mm in length of a side by a roller type cutter, (h) pulverizing the cubic pieces to particles having a diameter of 0.3 to 3 mm by a vertical type cutter, and (i) drying the particles with hot air.

18 Claims, No Drawings

PROCESS FOR PREPARING WATER-SOLUBLE ACRYLIC POLYMERS BY IRRADIATING AQUEOUS MONOMER SOLUTIONS CONTAINING A SURFACTANT

BACKGROUND OF THE INVENTION

The present invention relates to a process for preparing a water-soluble polymer having an excellent water solubility and a high molecular weight, and more particularly to a process for preparing a particulate water-soluble high molecular weight polymer having an excellent water-solubility and a uniform particle size by photopolymerization.

Water-soluble acrylic polymers, particularly acrylamide polymers, have been widely utilized as sizing agent, viscosity builder, waste water treating agent, precipitant for ore, etc. In particular, the use as a flocculant for various industrial waste waters is increasing more and more in recent years as a counter-measure for the environmental pollution. It has been generally considered that the properties of water-soluble polymers required for flocculant use are proportional to the molecular weight, and accordingly water-soluble polymers having a higher molecular weight tend to be demanded more and more.

Water-soluble acrylic polymers have been prepared by bulk polymerization, suspension polymerization, emulsion polymerization or solution polymerization. In general, high molecular weight polymers usable as a flocculant have been prepared by polymerization of an aqueous solution of a monomer.

The most general process for the preparation of high molecular weight water-soluble polymers in an aqueous solution system is a polymerization using a polymerization initiator producible a radical by heat energy or a peroxide-reducing agent redox initiator, and wherein the polymerization is carried out under mild conditions, e.g. at relatively low concentration of a monomer and at as low temperatures as possibe.

Other polymerization processes not using heat energy are a process using a light energy such as ultraviolet rays or visible rays, a process using a radiation energy, a process wherein the polymerization is conducted under high pressure, and the like. For instance, Japanese Unexamined Patent Publication (Tokkyo Kokai) No. 2094/1971 discloses a process for preparing a water-soluble polymer by subjecting an aqueous solution of an ethylenically unsaturated monomer to radiation polymerization.

However, the light- or radiation-initiated polymerization is liable to produce a polymer rich in a three dimensional network structure, namely a water-insoluble polymer, because the energy thereof is very large and the polymerization proceeds at a high rate, whereby occurrence of graft polymerization is accelerated. Also, even if a polymer having a little network structure is obtained, the molecular weight is very low and the polymer is not suited at all for uses requiring a high molecular weight, for instance, as flocculant. It is the present situation that the light- or radiation-initiated polymerization method is scarcely adopted on an industrial scale in production of water-soluble polymers having a high molecular weight for the reason mentioned above.

On the other hand, the light- or radiation-initiated polymerization is advantageous in that the polymerization proceeds at a very high rate. For instance, in case of polymerizing an aqueous solution of a monomer into which a polymerization inhibitor is incorporated as usually done, but in a larger amount, the polymerization is not initiated with ease by heat energy, but can be initiated in a very short period of time by irradiation of a light. In particular, in view of easy availability of a light energy source at a low cost in recent years, the utilization of light energy is desired in industrial production of water-soluble high molecular weight polymers.

Also, the light-initiated polymerization has some advantages as compared with conventional polymerization methods using heat energy. For instance, since the polymerization rate is very high, the polymerization time is markedly shortened and accordingly the productivity is improved. In view of the latest attention drawn to the toxity of monomers, a high conversion of monomers leads to lightening of environmental pollution. Also, from a viewpoint of installations, they can be made compact, since continuous polymerization in short time is possible. Accordingly, development of a technique which is improved in light-initiated polymerization so as to control or prevent the formation of three dimensional network structure and moreover which can produce polymers having a high molecular weight would greatly contribute to industrial progress.

It is an object of the present invention to provide a process for preparing water-soluble polymers which have a very high molecular weight and moreover have an excellent solubility in water, with good productivity by using a photopolymerization technique on an industrial scale.

A further object of the present invention is to provide a process for preparing a water-soluble high molecular weight polymer powder having a uniform particle size and an excellent water-solubility.

These and other objects of the present invention will become apparent from the description hereinafter.

SUMMARY OF THE INVENTION

The present inventors confirmed that the mechanism of photopolymerization is entirely different from the radical polymerization mechanism, and factors suited for radical polymerization are not always factors suited for photopolymerization, and have now reached the present invention on the basis of various studies on photopolymerization technique, pulverization technique, etc.

In accordance with the present invention, there is provided a process for preparing a particulate water-soluble polymer which comprises:

(a) adding at least one surfactant selected from the group consisting of a non-ionic surfactant and an anionic surfactant to an at least 20% by weight aqueous solution of a vinyl monomer in an amount of 0.001 to 1% by weight based on the monomer.

(b) adjusting the dissolved oxygen in the aqueous monomer solution to at most 1 mg/liter, (c) admixing the aqueous monomer solution with at most 0.03% by weight of a photopolymerization initiator based on the monomer, (d) continuously feeding the aqueous monomer solution in the form of a layer having a thickness of 3 to 10 mm onto a moving support located in an atmosphere containing at most 1% by volume of oxygen, (e) irradiating the layer of the aqueous monomer solution on the moving support with ultraviolet rays having a wavelength of 300 to 450 millimicrons at an intensity of at most 50 W/m$^2$, (f) continuously taking out the produced polymer in the form of a sheet having a thickness of 3 to 10 mm from the moving support, (g) breaking the polymer sheet to cubic pieces of 3 to 10 mm in length of a side by a roller type cutter, (h) pulverizing the cubic pieces to particles having a diameter of 0.3 to 3 mm by a vertical type cutter, and (i) drying the particles with hot air.

DETAILED DESCRIPTION

The process of the present invention is particularly suited for the preparation of water-soluble acrylamide polymers, the preparation of homopolymers of acrylic acid, methacrylic acid and their salts such as alkali metal salts, and the preparation of water-soluble acrylic cationic polymers.

The acrylamide polymers include a homopolymer of acrylamide, methacrylamide or their derivatives such as an dialkylacrylamide and acrylamide-2-methylpropane sulfonic acid, or a copolymer of these monomers, and a copolymer of acrylamide, methacrylamide or their derivatives with other water-soluble vinyl monomers. Examples of the above-mentioned other water-soluble vinyl monomers usable in the present invention are, for instance, an ethylenically unsaturated carboxylic acid such as acrylic acid or methacrylic acid, an alkali metal salt or amine salt of the ethylenically unsaturated carboxylic acid, an ethylenically unsaturated sulfonic acid such as acrylamide-2-methylpropane sulfonic acid or vinyl sulfonic acid, a salt of the ethylenically unsaturated sulfonic acid, and the like.

In the preparation of acrylamide polymers, a hydrophobic monomer may be employed so long as the produced polymer is soluble in water. Examples of the hydrophobic monomer are, for instance, an acrylic or methacrylic acid ester such as an alkyl acrylate or methacrylate, a hydroxyalkyl acrylate or methacrylate or an aminoalkyl acrylate or methacrylate, acrylonitrile, styrene, chlorostyrene, vinyl acetate, and the like.

The cationic polymers include a homopolymer of a cationic vinyl monomer having the following formula (1), and a copolymer of the cationic monomer (1) and other water-soluble vinyl monomers:

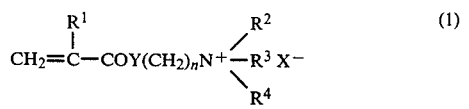

wherein $R^1$ is hydrogen atom or methyl group, $R^2$ and $R^3$ are an alkyl group having 1 to 4 carbon atoms, a hydroxyalkyl group or an aralkyl group, $R^4$ is hydrogen, an alkyl group having 1 to 4 carbon atoms, a hydroxyalkyl group or an aralkyl group, Y is —O— or —NH—, n is an integer of 1 to 4, and $X^-$ is an anion such as a halogen, alkyl sulfate, phosphoric acid or acetic acid ion.

Examples of the cationic monomer (1) are, for instance, β-acryloyloxyethyltrimethylammonium salts (e.g. chloride or sulfate), β-methacryloyloxyethyltrimethyl-ammonium salts, β-methacryloyloxyethyldimethylamine salts with acids such as hydrochloric acid, acetic acid and sulfuric acid, water-soluble salts of N,N-dimethylamino-n-propylacrylamide, N,N-dimethylaminoethylacrylamide, N,N-dimethylamino-n-propylmethacrylamide or N,N-dimethylaminoethylmethacrylamide, and the like. In the preparation of the cationic polymers, acrylamide, methacrylamide and their derivatives can be employed as other water-soluble vinyl monomers as well as those usable in the preparation of acrylamide polymers. Also, the hydrophobic monomers as mentioned above may be employed so long as the produced polymer is soluble in water.

An aqueous solution of a monomer, the concentration of which is at least 20% by weight, is subjected to photopolymerization. Preferably, the concentration of a monomer in the aqueous solution is from 20 to 45% by weight for the preparation of acrylamide polymers and from 50 to 80% by weight for the preparation of cationic polymers. A crosslinking reaction resulting in formation of three dimensional network structure becomes easy to occur with increasing the monomer concentration. Also, polymers completely soluble in water are generally low in degree of polymerization. However, a series of specified steps according to the present invention can produce polymers which have a very high molecular weight and moreover retain such a degree of water solubility as usable as flocculant. More preferably, the monomer concentration is from 30 to 40% by weight for the preparation of acrylamide polymers and from 60 to 70% by weight for the preparation of cationic polymers from a viewpoint that the quality of the polymers produced in a powder form by pulverization of polymer gels can be retained high. In case of the preparation of cationic polymers, the aqueous monomer solution is maintained at pH 4 to 7.

Lowering of the water solubility of the produced polymers owing to crosslinking, namely production of water-insoluble polymers, can be prevented by adding a surfactant to an aqueous solution of monomers, thus polymers having a high molecular weight and a good water solubility can be obtained. Further, the use of a surfactant makes it easy to take out the polymers from a polymerization apparatus and is also effective in lowering the tackiness inherent to the polymers, whereby adhesion of polymer particles to each other can be prevented. Non-ionic surfactants and anionic surfactants are usable in the preparation of acrylamide polymers, and non-ionic surfactants are usable in the preparation of cationic polymers.

Examples of the non-ionic surfactants are, for instance, a polyoxyethylene alkylphenyl ether, polyoxyethylene distyrenated phenyl ether, a polyoxyethylene alkyl ether, a polyethylene glycol fatty acid ester, a polyoxyethylene sorbitan fatty acid ester, and the like. Examples of the anionic surfactants are, for instance, a fatty alcohol sulfate or its salt such as lauryl sulfate or stearyl sulfate, an alkylarylsulfonic acid or its salt such as dodecylbenzenesulfonate, an alkylnaphthalenesulfonic acid formaldehyde condensate or its salt, a dialkyl sulfosuccinate or its salt, a polyoxyalkylene alkyl ether sulfate or its salt, and the like. These surfactants may be employed alone or in admixture thereof.

The surfactant is employed in an amount of 0.001 to 1% by weight based on the monomer or monomers used. When the amount of the surfactant is less than 0.001% by weight, the effects as mentioned above are not obtained, and when the amount is more than 1% by weight, the surfactant may act as a chain transfer agent, thus the molecular weight of the produced polymers is remarkably lowered and no desired high molecular weight polymers are obtained.

The surfactant may be employed in combination with at least one member selected from the group consisting of a hypophosphite, a urea compound and an aliphatic tertiary amine for the purpose of further improving the water-solubility of the produced polymers. namely preventing a crosslinking reaction during the polymerization and intermolecular and intramolecular crosslinking reaction during pulverization and drying of a polymer gel obtained by polymerization of an aqueous monomer solution. The combination of the surfactant and at least one member selected from the hypophosphite, the urea compound and the aliphatic tertiary amine can be arbitrary selected. The amount of the hypophosphite is selected preferably from 0.001 to 5.0% by weight based on the total weight of the monomer or monomers used. With respect to aliphatic tertiary amine and the urea compound, the amount is also selected preferably from 0.001 to 5.0% by weight based on the total weight of the monomer or monomers used.

Examples of the hypophosphite are, for instance, an alkali metal hypophosphite such as sodium hypophosphite or potassium hypophosphite, ammonium hypophosphite, and a tertiary amine salt of hypophosphorous acid. Examples of the aliphatic tertiary amine are, for instance, trimethylamine, triethylamine, dimethylethylamine, methyldiethylamine, triethanolamine, methyldiethanolamine, dimethylethanolamine and ethyl-diethanolamine. Examples of the urea compound are, for instance, urea. thiourea, ethyleneurea, and a guanidine salt.

The amount of dissolved oxygen in the aqueous monomer solution and the amount of oxygen present in the gas phase of the polymerization atmosphere should be decreased as low as possible, because they exert a bad influence on the polymerization reaction. The removal of oxygen can be attained by known methods, for instance, by introducing an inert gas such as nitrogen gas or carbon dioxide gas into an aqueous monomer solution or by enclosing the inert gas in or introducing it into a polymerization chamber. It is necessary to decrease the amount of dissolved oxygen to at most 1 mg/liter in advance of the polymerization. When the amount of dissolved oxygen is more than 1 mg/liter, the unreacted monomer remains and the degree of polymerization is not raised. For the same reason, it is necessary to maintain the concentration of oxygen in the polymerization atmosphere at not more than 1% by volume.

The ultraviolet rays used in the photo-polymerization are obtained from usually available light sources, e.g. xenon lamp, tungsten lamp. halogen lamp, carbon arc lamp, high pressure mercury lamp and low pressure mercury lamp. The most preferable wavelength of ultraviolet rays is from 300 to 450 m$\mu$.

Usual photoinitiators can be employed in the present invention, e.g. benzophenone, benzoin, a benzoin alkyl ether, an azo compound and a photoactivatable dyestuff such as a benzyl dye or an anthraquinone dye. A benzoin alkyl ether is preferred from the viewpoint of a rate of polymerization. The photoinitiator is employed in an amount of not more than 0.03% by weight based on the monomer used. The photoinitiator is added to an aqueous monomer solution and uniformly admixed therewith. It may be employed in a larger amount than 0.03% by weight. but a desired high molecular weight polymer is hard to obtain.

The photopolymerization can be carried out by a batchwise operation or a continuous operation. Preferably, the polymerization is carried out continuously on a moving support, e.g. an endless belt, from the viewpoint of production efficiency. Usually, the moving support is placed in a polymerization chamber. It is possible to subject an aqueous monomer solution to polymerization in the form of droplets or blocks, but preferably the monomer solution is supplied in the form of a layer having a thickness of 3 to 10 mm onto a moving support and then polymerized on the moving support. Preferably, in order to remove the reaction heat, a polymerization vessel or a moving support is cooled with water or cold water during the polymerization, whereby the polymerization can be efficiently conducted. The polymerization is carried out usually at a temperature of not more than 100° C., preferably not more than 60° C.

Ultraviolet rays are irradiated to an aqueous monomer solution. In general, the larger the intensity of light, the higher the rate of polymerization, but the smaller the molecular weight of the produced polymers. Also, the time of light irradiation at the time of the polymerization has a close relation to the intensity of ultraviolet rays. Accordingly, the light intensity and the irradiation time should be strictly selected in accordance with the desired degree of polymerization. The intensity of ultraviolet rays is at most 50 W/m$^2$, preferably from 15 to 30 W/m$^2$ at the surface of a polymerization vessel or a moving support. The irradiation time is from 25 to 90 minutes, preferably 30 to 60 minutes, for the preparation of acrylamide polymers, and is from 30 to 90 minutes, preferably 30 to 60 minutes, for the preparation of cationic polymers.

The polymers prepared under the above-mentioned conditions are obtained in the form of an aqueous gel. The polymer gel is taken out of a polymerization vessel or chamber. Water-soluble polymers are essentially very sticky. However, since a surfactant is used in the present invention for decreasing the stickiness, the produced polymers can be easily removed from the vessel or moving support. Particularly, in case of conducting the polymerization on a moving belt, the polymer gel in the form of a sheet can be continuously peeled off from the belt.

The peeling off of the produced polymers can be made more easily by covering the surface of a movable support such as a belt with a tetrafluoroethylene-ethylene copolymer. Also, the use of the tetrafluoroethylene-ethylene copolymer covering film whose back surface to be contacted with the movable support is metallized, for instance, by vaccum deposition of a metal such as aluminum, chromium or nickel, accelerates the photopolymerization because ultraviolet rays can be irradiated more efficiently.

Since the thus prepared polymer from an aqueous monomer solution having a monomer concentration as mentioned above is in the form of a gel which is hard or elastic and has no fluidity, it must be allowed to stand at high temperatures for a very long period of time when the massive or sheet-like polymer gel is subjected to drying without mechanically pulverizing it. As a result, the molecular weight is lowered and the crosslinking accompanied by heating for drying takes place, thus resulting in marked lowering of the commercial value of the products. Accordingly, there has generally been adopted a process wherein after roughly pulverizing the massive or sheet-like polymer gel to coarse particles by any mechanical means, water is removed from the particles by heat drying. In a widely adopted process of drying. a polymer gel obtained by polymerization is formed into a strand-like form by an extruder like a meat grinder, and then dried by heating. However, the use of the extruder is not always satisfactory, particularly when the polymer is very hard, because the friction against the wall surface of the extruder is large, thus not only the machine efficiency is decreased, but also the polymer gel itself is subject to deterioration due to frictional heat or mechanical force, thereby resulting in lowering of the molecular weight due to severance of molecule.

The present invention also provides a process for preparing a finely divided polymer gel without deterioration of the polymer gel due to frictional heat and mechanical force which results in lowering of the molecular weight.

The polymer gel sheet taken out of the moving support may be allowed to stand for at most 5 minutes in hot air at a temperature of 50° to 120° C. for improving the state of the sheet surface, before subjecting to pulverization procedures.

In the present invention, a polymer gel is fed to a roller type cutter from the upper portion thereof, and is cut into strips having a wideth of 3 to 10 mm by a pair of rollers which have a plurality of annular projections or grooves at predetermined intervals on their surfaces and rotate in the different direction from each other to engage with each other, for instance, by feeding the gel from the engaging upper portion of the rollers rotating in the downward direction and making the gel bite into the rollers. When the sheet-like polymer gel is continuously taken out of one end of a moving support such as an endless belt and is continuously made to bite into the roller cutter, it is possible to practice the process of the invention continuously and accordingly to raise the production efficiency. The polymer gel strips are then cut into cubic pieces of 3 to 10 mm in length of a side by a combination of a fixed blade extending in the axial direction of the roller cutter over at least the full length of the roller cutter and a rotary cutter including a rotatable cylindrical body provided on its periphery with at least one blade extending in the axial direction.

When the polymer gel is cut into pieces by the roller type cutter, it is important to adjust the polymer concentration, in other words, the water content, of the polymer gel. In case of a gel of the acrylamide polymers, the polymer concentration is maintained at 20 to 60% by weight, and in case of a gel of the cationic polymers, the polymer concentration is maintained at 50 to 85% by weight. If the polymer concentration is less than the above ranges, it is difficult to cut into desired cubic pieces. Also, if the polymer concentration is more than the above ranges, the gel is very hard and continuous cutting becomes very difficult due to a large load imposed on the machine. It is also important to maintain the polymer concentration within the above ranges in point of retaining the water solubility and preventing the molecular weight from lowering.

The thus obtained cubic polymer gel pieces are pulverized into particles having a particle size of 0.3 to 3 mm by a vertical type cutter. At that time, the polymer concentration of the gel is maintained within the range of 20 to 60% by weight for the acrylamide polymers or within the range of 50 to 85% by weight.

The vertical type cutter includes a casing, at least one vertically fixed blade arranged in the casing in a vertical direction, a rotary blade provided rotatably and vertically and positioned to form a space between it and the fixed blade, and a screen which is arranged to form a part of the walls of a cutting chamber and through which the pulverized gel particles are taken out. For instance, the cubic pieces are fed from an upper portion of the casing, and pulverized by the fixed blade and the rotating blade in the cutting chamber formed by the screen and a part of the walls of the casing, and the pulverized gel is taken out through the openings of the screen. The feature of the structure of the vertical type cutter resides in that the residence time for pulverization can be controlled by adjusting the space between the edge of the rotary blade and the edge of the fixed blade positioned around the rotary blade, and changing the size of the openings of the screen, and further by installing a plurality of the vertical type cutters in series, namely by passing the polymer gel through the cutter 2 to several times, whereby pulverization to fine particles, for instance, having a diameter of less than 1 mm can be made easily. Moreover, there is produced a desirable effect that the shape of the thus obtained fine particles having a particle size of less than 1 mm approximates sphere. The pulverization technique for polymer gels using a pulverizer having such a structure has not been established.

Preferably, the pulverization by the vertical type cutter is carried out in stages. For instance, when the cut pieces of a polymer gel is pulverized by the vertical type cutter provided with a screen having an opening diameter of 3 mm in the first stage, gel particles having a uniform particle size of not more than about 3 mm are obtained. The gel particles are then pulverized by the cutter provided with a screen having an opening diameter of 2 mm and further by the cutter provided with a screen having an opening diameter of 1 mm, thus roundish fine particles having a particle size of not more than about 1 mm are obtained. Like this, finely divided polymer gel having a desired particle size can be obtained by selecting the screen in accordance with the desired particle size.

According to the above pulverization technique dust generation scarcely occurs because the polymer gel is subjected to pulverization in the wet state, and also the distribusion of the particle size is very narrow. Accordingly, usually adopted procedures, namely steps for drying of a polymer gel and subsequent pulverization followed by grading or screening. are not required.

It is one of the features of the present invention that a polymer gel containing water in large quantities is pulverized without drying in advance of pulverization, and a finely divided high molecular acrylic polymer having an excellent water solubility and a uniform particle size can be obtained only when such a pulverization technique is adopted.

In cutting to relatively large pieces and then pulverizing into fine particles, it is preferable to maintain the temperature of the polymer gel as low as possible in order to raise the efficiency and prevent the pieces or the fine particles from sticking to each other. It can be attained, for instance, by sufficiently conducting the cooling or by compulsory cooling the produced polymer gel with cold air or the like prior to cutting by the roller type cutter. Preferably, the polymer gel is maintained at a temperature of 10° to 30° C., especially not more than 20° C.

In the cutting step and the pulverizing step. polyethylene glycol, a non-ionic surfactant or an anionic surfactant may be added to the roller type cutter or the vertical type cutter or may be applied to the surfaces of the cut gel cubic pieces, as occasion demands, in order to prevent the cubic pieces or the fine particles from sticking to each other.

The thus obtained finely divided polymer gel is dried in known manners, e.g. by hot air drying or through-flow drying on a belt, thereby giving a polymer powder having a water content of not more than 10% by weight.

According to the process of the present invention, further pulverization or grading of the powder is not required, but of course may be adopted, as occasion demands.

Homopolymers of acrylic acid, methacrylic acid and their salts can be prepared in the same manner as the preparation of the acrylamide polymers, and the conditions for preparing the acrylamide polymers can be applied to the preparation of these homopolymers.

The polymers obtained according to the present invention have a very high molecular weight. For instance, the acrylamide polymers have an intrinsic viscosity of at least 20 dl/g, especially 25 to 30 dl/g, and the cationic polymers have an intrinsic viscosity of at least 3 dl/g, especially 4 to 15 dl/g.

The present invention is more specifically described and explained by means of the following Examples, in which all % are by weight unless otherwise noted. It is to be understood that the present invention is not limited to the Examples, and various changes and modifications may be made in the invention without departing from the spirit and scope thereof.

EXAMPLE 1

An aqueous monomer solution having the following composition was prepared.

| Ingredients | Amount (g) |
| --- | --- |
| Acrylamide | 160 |
| Acrylic acid | 30 |
| Sodium hydroxide | 17 |
| Polyoxyethylene nonylphenyl ether (HLB: 15) | 0.06 |
| Sodium hypophosphite | 0.01 |
| Thiourea | 2 |

The total amount of the solution was adjusted to 500 g with deionized water. In dioxane was dissolved 0.4 g of benzoin ethyl ether, and the total volume was adjusted to 10 ml.

The aqueous monomer solution was degassed with nitrogen gas in a 1 liter cylindrical degassing vessel to decrease the dissolved oxygen to 0.5 mg/liter. After adding 1 ml of the dioxane solution of benzoin ethyl ether to the degassed monomer solution, the monomer solution was placed in the form of a layer having a thickness of 8.3 mm in a polymerization vessel (300 mm in length, 200 mm in width and 50 mm in height) equipped with a jacket and arranged in a box-shaped small chamber filled with nitrogen gas to maintain the oxygen concentration at not more than 1% by volume. From three 100 W low pressure mercury lamps arranged over the polymerization vessel in the chamber so that the intensity of ultraviolet rays was 20 W/m$^2$ at the surface of the polymerization vessel, ultraviolet rays were irradiated to the monomer solution layer, while passing water of 25° C. through the jacket. After about 30 seconds from the irradiation, the polymerization started. The polymerization was continued and the irradiation was stopped 30 minutes later. The obtained polymer was in the form of a hard gel, and could be easily peeled off from the vessel.

The obtained sheet-like polymer gel was then cut by a roller type cutter as mentioned before to cubic pieces having a dimension of 3×8×3 mm. At that time, the polymer concentration of the gel was 43%. The cutting was done without any sticking of the cubic gel pieces.

The cubic gel pieces were then pulverized into polymer gel particles having a uniform particle size of about 1 mm in three stages by a vertical type cutter as mentioned before using a screen having an opening diameter of 3 mm in the first stage a screen having an opening diameter of 2 mm in the second stage and a screen having an opening diameter of 1 mm in the third stage. In the pulverization, the polymer concentration of the gel was 45%.

The gel particles were then dried with hot air at 80° C. for about 25 minutes to give a polymer powder having a uniform particle size of about 0.8 mm $\phi$ and a water content of not more than 10%. The obtained polymer powder showed an intrinsic viscosity of 23 dl/g and provided an aqueous solution containing no water-insoluble material, thus was very suited for use as a flocculant.

EXAMPLE 2

An aluminum deposited tetrafluoroethylene-ethylene copolymer film was attached to the surface of a stainless steel endless belt having a width of 450 mm and an effective length of 3,000 mm so that the metallized surface came into contact with the belt surface. The endless belt was placed in a chamber filled with nitrogen gas to maintain the oxygen concentration at not more than 1% by volume, while sprayers were arranged so that hot water or cold water could be sprayed to the back of the endless belt. The endless belt was operated at a rate of 100 mm/minute, and water of 15° C. was sprayed upwardly to the belt. Also, low pressure mercury lamps were arranged as a ultraviolet ray source over the endless belt so that the intensity of ultraviolet rays was 30 W/m$^2$ at the belt surface.

An aqueous monomer solution was prepared by admixing the following ingredients and adjusting the total weight to 40 kg with deionized water.

| Ingredients | Amount |
| --- | --- |
| Acrylamide | 12.80 kg |
| Acrylic acid | 2.40 kg |
| Sodium hydroxide | 1.36 kg |
| Non-ionic surfactant (polyoxyethylene nonylphenyl ether; HLB 15) | 4.80 g |
| Sodium hypophosphite | 0.8 g |
| Thiourea | 160 g |

About 40 liters of the aqueous monomer solution was degassed thoroughly with nitrogen gas to lower the dissolved oxygen below 1 mg/liter, and then continuously fed at a rate of 13.5 liters/hour to one end of the moving belt. Simultaneously, a 5% solution of benzoin isopropyl ether in methanol was fed as a photoinitiator solution at a rate of 30 ml/hour from a 5 liter temporary storage tank equipped with a stirrer and installed over the belt to the fed monomer solution to uniformly admix the both solutions, thus the polymerization by irradiation of ultraviolet rays was carried out.

In case of the above conditions, the time in which the monomer solution was subjected to the polymerization on the moving belt was 30 minutes, and the thickness of the monomer solution layer on the belt was about 5 mm.

A polymer gel in the form of a sheet having a thickness of about 5 mm was obtained from another end of the endless belt 30 minutes after starting the feed of the aqueous monomer solution. The produced polymer sheet was in the state that it could be easily peeled off from the belt surface by human power, and continuous polymerization for about 3 hours was possible. The temperature of the obtained polymer gel was 20° C.

The polymer gel sheet continuously peeled off from another end of the endless belt was supplied to a roller type cutter having a structure as mentioned before to cut into cubic polymer gel pieces having a dimension of 3×5×5 mm.

The cubic pieces were then pulverized by a vertical type cutter having a structure as mentioned before and using a screen having an opening diameter of about 3 mm, while passing cold air of about 15° C. therethrough, and subsequently pulverized by the vertical type cutters using a screen having an opening diameter of about 2 mm and a screen having an opening diameter of about 1 mm in that order, to give a finely divided polymer gel having a uniform particle size of about 1 mm.

The obtained gel particles were then dried by a through flow band type drier at 80° C. for about 30 minutes to give a polymer powder having a water content of at most 10% and having a particle size of about 0.8 mm $\phi$.

The obtained polymer powder did not contain a water-insoluble material at all, and the intrinsic viscosity was 22.5 dl/g.

EXAMPLE 3

The procedures of Example 2 were repeated except that 40 kg of an aqueous monomer solution containing the following ingredients and adjusted to pH 5 was employed to give a finely divided polymer gel having a uniform particle size of about 1 mm.

| Ingredients | Amount |
| --- | --- |
| β-Methacryloyloxyethyl-trimethylammonium chloride (solid content 80%) | 37,500 g |
| Polyoxyethylene distyrenated phenyl ether (HLB 12) | 15 g (conc. 0.05%) |
| Sodium hypophosphite | 3 g (conc. 0.01%) |

The obtained polymer gel particles were dried by a through-flow band type dryer at 80° C. for about 13 minutes to give a polymer powder having a water content of not more than 10% and a uniform particle size of about 0.9 mm $\phi$.

The polymer powder did not contain a water-insoluble material at all, and the intrinsic viscosity was 7.8 dl/g.

In addition to the ingredients used in the Examples, other ingredients can be used in the Examples as set forth in the specification to obtain substantially the same results.

What we claim is:

1. A process for preparing a particulate water-soluble polymer having a high molecular weight, an excellent water solubility and a uniform particle size which comprises:
   (a) adding at least one surfactant selected from the group consisting of a non-ionic surfactant and an anionic surfactant to an at least 20% by weight aqueous solution of a vinyl monomer in an amount of 0.001 to 1% by weight based on the monomer said surfactant being employed in combination with at least one member selected from the group consisting of with at least one member selected from the group consisting of a hypophosphite, a urea compound and an aliphatic tertiary amine,
   (b) adjusting the dissolved oxygen in the aqueous monomer solution to at most 1 mg/liter,
   (c) admixing the aqueous monomer solution with at most 0.03% by weight of a photopolymerization initiator based on the monomer,
   (d) continuously feeding the aqueous monomer solution in the form of a layer having a thickness of 3 to 10 mm onto a moving support located in an atmosphere containing at most 1% by volume of oxygen,
   (e) irradiating the layer of the aqueous monomer solution on the moving support with ultraviolet rays having a wavelength of 300 to 450 millimicrons at an intensity of at most 50 W/m$^2$,
   (f) continuously taking out the produced polymer in the form of a sheet having a thickness of 3 to 10 mm from the moving support,
   (g) breaking the polymer sheet to cubic pieces of 3 to 10 mm in length of a side by a roller cutter in a wet state,
   (h) pulverizing the cubic pieces to particles having a diameter of 0.3 to 3 mm by a vertical cutter in a wet state, and
   (i) drying the particles with hot air.

2. The process of claim 1, wherein said aqueous monomer solution is a 20 to 45% by weight aqueous solution of a monomer selected from the group consisting of acrylamide, methacrylamide, their derivatives and a combination of these monomers and other water-soluble vinyl monomers, and irradiated on the moving support with ultraviolet rays for 25 to 90 minutes, and the polymer concentration of the polymer sheet is maintained at 20 to 60% by weight during each of the breaking step (g) and the pulverizing step (h).

3. The process of claim 2, wherein said other water-soluble vinyl monomer is a member selected from the group consiting of acrylic acid, methacrylic acid, acrylamide-2-methylpropane sulfonic acid vinyl sulfonic acid.

4. The process of claim 1, wherein said aqueous monomer solution is a 50 to 80% by weight aqueous solution of a cationic vinyl monomer or a combination a cationic vinyl monomer and other water-soluble vinyl monomers maintained at a pH 4 to 7, to which a non-ionic surfactant is added, and irradiated on the moving support with ultraviolet rays for 25 to 90 minutes, and the polymer concentration of the polymer sheet is maintained at 50 to 85% by weight during each of the breaking step (g) and the pulverizing step (h).

5. The process of claim 4, wherein said cationic vinyl monomer is a compound having the formula:

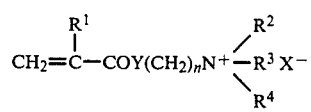

wherein R$^1$ is hydrogen atom or methyl group, R$^2$ and R$^3$ are an alkyl group having 1 to 4 carbon atoms, a hydroxyalkyl group or an aralkyl group, R$^4$ is hydrogen, an alkyl group having 1 to 4 carbon atoms, a hydroxyalkyl group or an aralkyl group, Y is —O— or —NH—, n is an integer of 1 to 4, and $X^-$ is an anion selected from the group consisting of a halogen ion, an alkyl sulfate ion, a phosphoric acid ion or an acetic acid ion.

6. The process of claim 4, wherein said other water-soluble vinyl monomer is a member selected from the group consisting of acrylamide, acrylonitrile, hydroxyethyl acrylate and hydroxyethyl methacrylate.

7. The process of claim 1, wherein said non-ionic surfactant is at least one member selected from the group consisting of a polyoxyethylene alkylphenyl ether, polyoxyethylene distyrenated phenyl ether, a polyoxyethylene alkyl ether, a polyethylene glycol fatty acid ester and a polyoxyethylene sorbitan fatty acid ester.

8. The process of claim 1, wherein said anionic surfactant is a member selected from the group consisting of a fatty alcohol sulfate or its salt, an alkylaryl-sulfonic acid or its salt, an alkylnaphthalenesulfonic acid formaldehyde condensate or its salt, a dialkyl sulfosuccinate or its salt, a polyoxyalkylene alkyl ether sulfate or its salt.

9. The process of claim 1, wherein said photopolymerization initiator is at least one member selected from the group consisting of benzoin, a benzoin alkyl ether, a benzyl dye, benzophenone and an anthraquinone dye.

10. The process of claim 1, wherein the surface of said moving support is covered with a tetrafluoroethylene-ethylene copolymer film.

11. The process of claim 1, wherein the surface of said moving support is covered with a tetrafluoroethylene-ethylene copolymer film the back of which is metallized.

12. The process of claim 1, wherein said irradiating is conducted with an intensity of 15 to 30 W/m$^2$ for 30 to 60 minutes.

13. The process of claim 1, wherein said moving support is cooled from the back side with water or cold water during irradiating.

14. The process of claim 1, wherein said polymer sheet taken out of said moving support is allowed to stand for at most 5 minutes in hot air at a temperature of 50° to 120° C.

15. The process of claim 1, wherein an nonionic surfactant, polyethylene glycol or an aqueous solution thereof is applied to said polymer sheet at least after taking out of the moving support.

16. The process of claim 1, wherein said pulverizing is conducted, while introducing cold air into said vertical cutter.

17. The process of claim 2, wherein the produced water-soluble polymer has an intrinsic viscosity of at least 20 dl/g.

18. The process of claim 4, wherein the produced water-soluble polymer has an intrinsic viscosity of 4 to 15 dl/g.

* * * * *